(12) United States Patent
Delmege et al.

(10) Patent No.: US 8,125,983 B2
(45) Date of Patent: Feb. 28, 2012

(54) VOIP TELECOMMUNICATIONS SWITCH

(75) Inventors: James W. Delmege, North Chili, NY (US); Paul A. Reynolds, Walworth, NY (US)

(73) Assignee: Redcom Laboratories, Inc., Victor, NY (US)

( * ) Notice: Subject to any disclaimer, the term of this patent is extended or adjusted under 35 U.S.C. 154(b) by 1142 days.

(21) Appl. No.: 11/840,618

(22) Filed: Aug. 17, 2007

(65) Prior Publication Data

US 2008/0043980 A1 Feb. 21, 2008

Related U.S. Application Data

(60) Provisional application No. 60/838,208, filed on Aug. 17, 2006.

(51) Int. Cl.
*H04L 12/66* (2006.01)
*H04L 12/28* (2006.01)
*G06F 15/16* (2006.01)

(52) U.S. Cl. ......... 370/353; 370/401; 370/467; 709/228

(58) Field of Classification Search ........................ None
See application file for complete search history.

(56) References Cited

U.S. PATENT DOCUMENTS

| | | | |
|---|---|---|---|
| 4,228,536 A | 10/1980 | Gueldenpfennig et al. | |
| 6,353,610 B1* | 3/2002 | Bhattacharya et al. | 370/352 |
| 6,363,424 B1* | 3/2002 | Douglas et al. | 709/224 |
| 6,721,565 B1* | 4/2004 | Ejzak et al. | 455/436 |
| 6,891,827 B2* | 5/2005 | Cho | 370/356 |
| 6,917,612 B2* | 7/2005 | Foti et al. | 370/352 |
| 6,950,441 B1* | 9/2005 | Kaczmarczyk et al. | 370/467 |
| 6,963,583 B1* | 11/2005 | Foti | 370/467 |
| 6,996,076 B1* | 2/2006 | Forbes et al. | 370/310 |
| 7,103,002 B2* | 9/2006 | Bjelland et al. | 370/242 |
| 7,139,263 B2* | 11/2006 | Miller et al. | 370/352 |
| 7,304,984 B2* | 12/2007 | Butler et al. | 370/352 |
| 2003/0076815 A1* | 4/2003 | Miller et al. | 370/352 |
| 2006/0015877 A1* | 1/2006 | Kandregula et al. | 719/310 |
| 2006/0256774 A1* | 11/2006 | Rigaldies et al. | 370/352 |
| 2007/0030843 A1* | 2/2007 | Miller et al. | 370/352 |

OTHER PUBLICATIONS

International Search Report and Written Opinion in corresponding PCT application (PCT/US07/76213 filed Aug. 17, 2007) total 7 pages, dated Mar. 5, 2008.

* cited by examiner

*Primary Examiner* — Gregory Sefcheck
(74) *Attorney, Agent, or Firm* — Thomas R. FitzGerald; Hiscock & Barclay, LLP

(57) ABSTRACT

An exploitation of the proper classification of conventional call processing states into categories, each category corresponding to one of the call states of the SIP finite-state machine (FSM), yields simplified design, implementation, and operation of heterogeneous call processing. A separate FSM for the SIP-categorized call states running in parallel with a conventional port event processing (PEP) FSM, implements a VoIP Local Call Controller by passing events between the SIP-type FSM and the PEP FSM only at the points where a transition between SIP categories occurs.
The SIP FSM does not require notification of PEP FSM transitions not affecting the SIP call state. For this reason, none of the code associated with the transitions between PEP FSM states within the same major state category requires any modification. Consequently the integration of VoIP and PEP call processing can be done more simply, and at dramatically-reduced cost in software development, support, and maintenance.

9 Claims, 5 Drawing Sheets

VOIP TELECOMMUNICATIONS SWITCH

CROSS-REFERENCE TO RELATED APPLICATIONS

Reference is made to and priority claimed from U.S. Provisional Application Ser. No. 60/838,208, filed Aug. 17, 2006, and its entire contents is hereby incorporated by reference.

FIELD OF THE INVENTION

The invention concerns the processing of telephone calls, and more specifically the processing of telephone calls over the Internet using the VoIP (Voice over Internet Protocol) technology and conventions.

BACKGROUND OF THE INVENTION

Any telephone call progresses through a series of steps from beginning to end. Each step is identified with a state or status of the call, and the progress from one step to the next in a call is termed a transition. For example, a subscriber picks up a phone handset to make a call, and the call shifts from an idle state to a dial tone ('tone') state. When the subscriber begins to dial or press in a number, the call shifts from the tone state to a dialing ('dial') state. When the switching network locates the called line and begins sending ring signals to the receiving phone, the call state shifts from 'dial' to 'ringing'. This process continues until the call is ended and the state returns to 'idle'. These changes from state to state are the transitions of the state of the call.

In conventional call processing technologies, all the system intelligence for processing telephone calls has resided in the central switching element, for example, the High Density Exchange (HDX), a high-density version of the system originally covered in U.S. Pat. No. 4,228,536, said patent incorporated herein by reference, and hereinafter referred to as "the '536 patent". The endpoint instruments in conventional call processing have been 'dumb', i.e., they do not contain any call processing elements.

Central switching elements in conventional call processing are not restricted to single physical components. For example, in systems using Modular Switching Peripheral (MSP) architecture, also known in the industry as Computer/Telephony Integration, or CTI, the MSP together with the host computer constitute the central switching element. Although ISDN (Integrated Services Digital Network) telephones have some intelligence, call control still resides almost exclusively with the central switching element.

VoIP transforms the conventional switching architecture. Simply by purchasing some VoIP telephones and connecting them to an existing Ethernet LAN, a provider can construct a basic VoIP telephone network. The provider can configure the phones either manually or through a simple Web-based interface. As a result, the provider can supply a private phone system without any special software or hardware anywhere else in the network, so that the phones can dial, ring, and talk to one another. In such an architecture, the phones contain all the intelligence needed to make the VoIP network operate.

As the VoIP system scales up in size, it obtains advantages from the reintroduction of a central switching element to facilitate system administration and provision of certain features. But in contrast to practice in conventional telephone networks, the reintroduced central switching element, often called a Call Manager or LCC (Local Call Controller), operates with the VoIP phones principally at a peer-to-peer level.

Integrating a VoIP system with a mature, complex, and feature-rich system utilizing centralized call processing, such as the HDX platform, presents unique challenges. Attempting to integrate existing centralized call processing logic with decentralized VoIP call processing makes control of a call an issue between the central switching element and the telephone itself.

Call processing is implemented using a finite state machine (FSM), a design structure well-known in the art, in which a call is always in one of a finite number of discrete states (e.g., Dialing, Ringing, Talking, and others), and an event occurring in the system can trigger an action to cause the call to progress from one state to another.

The HDX call-processing FSM, also called Port Event Processing (PEP), currently has hundreds of call states and thousands of software components used for processing the events which occur in each of these states. The integration of VoIP with the HDX would, under the application of ordinary skill in the art, require a system builder to rework most of the software components comprising the FSM (PEP).

The conventional way to implement a new feature within a call processing FSM is to begin by examining carefully each and every call state, event, and transition routine. "Transition routine" is the name for the actual code which executes when a given event is received for a port in a given state. A transition routine performs some action appropriate to the event and the current state, and its action may include a transition to a different state.

The next step in conventional feature implementation is the design and implementation of code for one or more existing transition routines, and possibly the addition of new states and events as well, together with new transition routines to process the new states and events. Every state transition in the FSM represents added exposure to potential software bugs whenever an incorrect modification is made in support of the new feature, or whenever a required change is erroneously overlooked. The large number of state transitions therefore makes feature implementation in the conventional way a highly error-prone task, raising its cost considerably. Avoidance of such extensive rework of software would be highly advantageous.

Furthermore, PEP/HDX integration, done properly, would other providers a clear, smooth path between powerful, well-established, but less-flexible conventional call processing systems and the highly-flexible VoIP systems offering all the potential of the Internet. Opening such a path would grant telephony system providers clear advantages over either technology alone.

SUMMARY

Since the Session Initiation Protocol (SIP) standard for voice-over-Internet Protocol (VoIP) only distinguishes major call states, its finite state machine (FSM) is relatively simple. In contrast, the conventional call-processing FSM distinguishes up to hundreds of distinct states for any call. The present invention exploits the proper classification of conventional call-processing states into categories each corresponding to the major call states such as "idle", "dialing", "ringing" and "talking". These major call states are similar but not identical to the SIP FSM's call states. The invention provides a separate FSM for the SIP-categorized call states, running in parallel with a conventional port event processing (PEP) FSM and implements a VoIP LCC by passing events between the SIP-type FSM and the PEP FSM only at the points where a transition between major call state categories occurs.

Using the invention, the SIP FSM does not require notification of PEP FSM transitions not affecting the SIP call state. Similarly, the PEP FSM does not require notification of SIP FSM transitions not affecting the PEP FSM call state. Transitions between major states occur much less frequently than transitions between PEP FSM states within the same major call state category as classified by the invention. For this reason, none of the code associated with the transitions between PEP FSM states within the same major call state category requires any modification. Consequently the integration of VoIP and PEP call processing can be done using the present invention more simply, and at dramatically-reduced cost in software development, support, and maintenance.

DETAILED DESCRIPTION OF THE INVENTION

Figure 1:
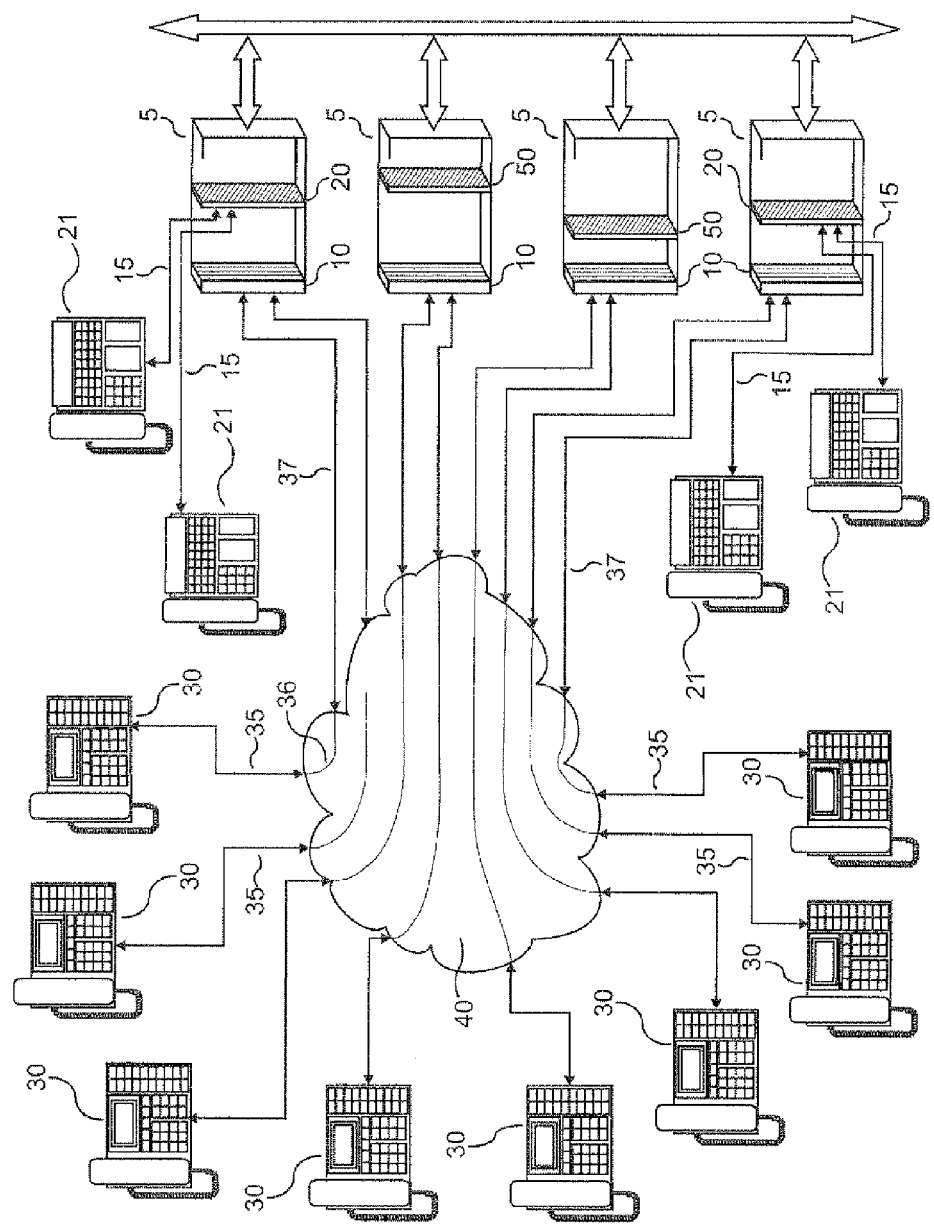
FIG. 1 is an overall block diagram of the preferred embodiment showing a multi-shelf system and a number of connected analog and IP phones.

FIG. 1 shows a plurality of Modular Switching Units (MSUs) 5. The present invention functions with one MSU in smaller configurations, and multiple MSUs in larger configurations. The MSU 5 functions generally as disclosed in the '536 patent, but as adapted for the present invention the port capacity and control processor (Controller) capabilities have been significantly improved. The Controller 10 in FIG. 1 corresponds to the MPU function in the '536 patent.

In FIG. 1, analog lines 15 are shown connected to time-division multiplexed (TDM) port interfaces 20. In the case of analog lines the TDM port interfaces 20 correspond to the line circuits of the '536 patent. Each analog line connection is a physical connection of the two conductors needed for an analog telephone circuit, commonly referred to as the 'tip' and 'ring' conductors.

Also in FIG. 1, Internet protocol (IP) phones 30 are shown connected 35, 36, 37 to the various Controllers 10. In the case of IP phones 30, there is no individual physical connection between the various IP phones 30 and the Controllers 10. Instead, there is a single physical connection extending from each phone 30 and from each Controller 10 to an IP routing infrastructure such as a local area network (LAN) 40. Each line 35, 36, 37 shown in FIG. 1 connecting an IP phone 30 with a controller 10 indicates a logical association.

Each IP phone 30 has a priori the IP address of a specific Controller 10 to which it periodically directs a SIP REGISTER message. By means of this REGISTER message the controller 10 is able to identify, authenticate, and communicate with the IP phone 30, so that the logical connection amounts to a physical connection as far as communication of SIP messages is concerned. The SIP protocol is a standard issued by the Internet Engineering Task Force (IETF) and defined in the IETE's Request for Comment (RFC) 3261, incorporated herein by reference. The IP routing infrastructure is well-known in the art, and comprises the network hardware and software, including routers, hubs, and gateways and their supporting programs, needed for communication using Internet protocols. In FIG. 1, the IP routing infrastructure comprises a local area network that uses the Ethernet protocol.

The present invention retains support of calls originating at an IP phone and terminating at an analog phone, or originating at an analog phone and terminating at an IP phone. Such call support is provided via the Media Servers 50 shown in FIG. 1. Media Servers 50 are controlled by the MSU Controller 10 in the same manner as any other port circuit is controlled.

Media Servers (also called Media gateways) actually look like another kind of port interface, and are directly connected to the controller unit computer system, just like the other port interfaces. Logical connections 35, 36, 37 exist between VoIP phones 30 and controllers 10. When a call is up that does NOT require conversion from IP to TDM, no port interface is needed. But when a call is up that involves both a VoIP phone 30 and an analog or digital phone 21 connected to a port interface 20, then an additional logical connection will exist from the VoIP phone 30 through the IP network 40 to one of the Media Servers or gateways 50. This second logical connection handles the Real-Time-Protocol (the actual voice data) for the call, and the Media Server acts as a port interface in this case.

Although not shown in FIG. 1, other circuits of the general types disclosed in the '536 patent may also occur in the network shown.

The association or assignment of an IP phone to a specific Controller is arbitrary and in no way limits the capabilities of the system. The main objective is to distribute the IP phones as uniformly as possible among the Controllers in order to reduce the impact of a service outage resulting from the loss of an MSU.

Figure 2:
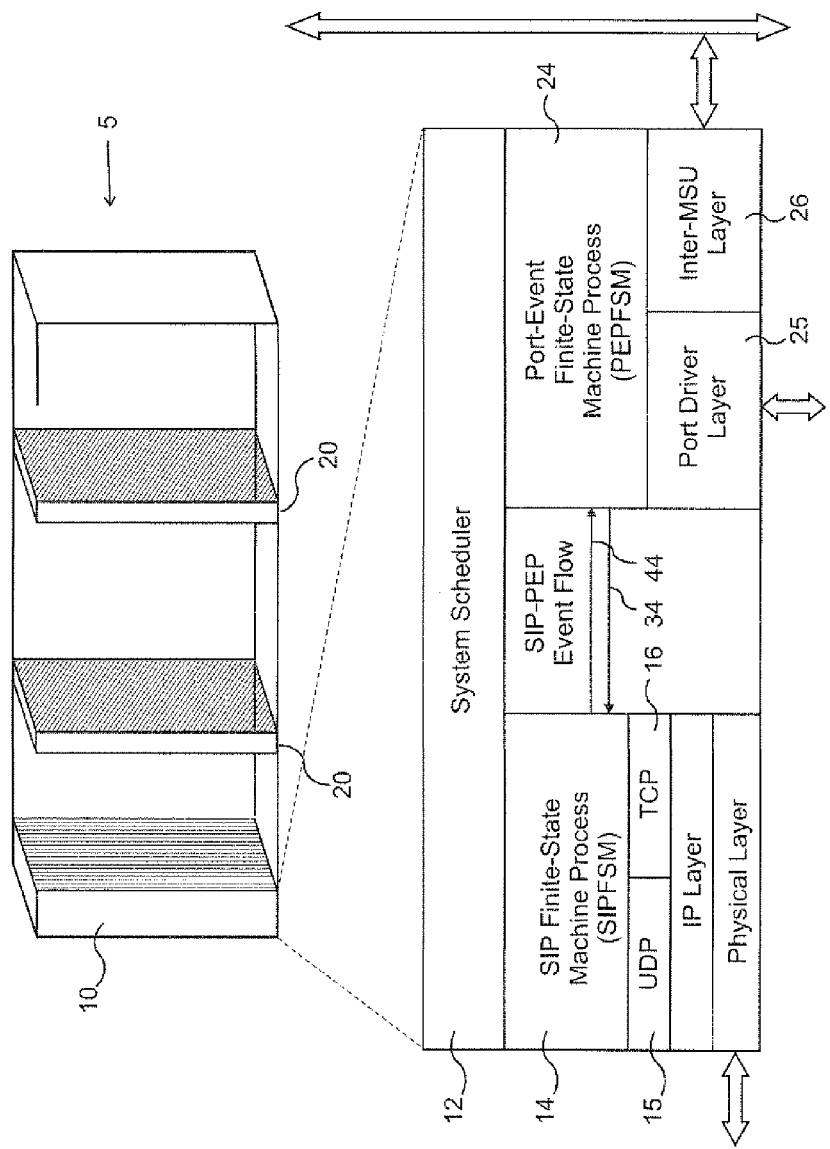
FIG. 2 is an expanded view of a single MSU showing the salient software elements.

FIG. 2 depicts the salient software elements of the Controller. The System Scheduler 12 directs the controller's processor to execute the SIP FSM process (SIPFSM) 14 when required, and the PEP FSM process (PEPFSM) 24 when required. The occurrence of an event that alters one or more conditions requiring processing by a specific FSM causes that FSM to be scheduled for execution.

The SIPFSM 14 receives call events from the UDP and TCP layers 15, 16 of the Internet protocol. Said events represent primarily SIP messages received from IP phones 30 associated with the Controller with which the IP phone has registered. The SIPFSM 14 also receives events from a second source, the PEPFSM 24, via the connection 34 shown in FIG. 2. Finally, the SIPFSM 14 receives events from a third source, the timers within the SIPFSM itself, marking the ends of time intervals, or delays.

Similarly, the PEPFSM 24 receives events from the Port Driver layer 25. These represent primarily port-related messages received from the various port interfaces associated with the Controller 10 in a particular MSU 5. The PEPSFM 24 also receives events from a second source, the SIPFSM 14 via the connection 44, as shown in FIG. 2. In the same manner as for the SIPFSM, the PEPFSM receives events from a third source, the timers within the PEPFSM itself, marking the ends of time intervals, or delays.

In single and multiple MSU systems, the PEPSFM sends and receives inter-process messages (IPMs). In multiple MSU systems, the IPMs are carried on Inter-MSU link 26 as shown in FIG. 2. IPMs signal events between separate instances of the PEPSFM in different MSUs.

Typical instances of port state classes, as determined by events occurring during a call, are: IDLE, TALKING, RINGING, TONE, and HOLD. The actual state classes existing in a given system may vary depending on the particular applications for which the system is designed. A list of port state classes is presented here as typical—within each port state class, there may be numerous distinct port states.

UNKNOWN
OFF_LINE
IDLE
IN_USE
TRANSITION
SEIZE
RELEASE
TONE
TALK
RINGING
DIAL
HOLD,
EQU_BUSY
RING_BACK
BUSY_TONE
AWAIT_ATND
MAGNETO_CRANK

Figure 3:
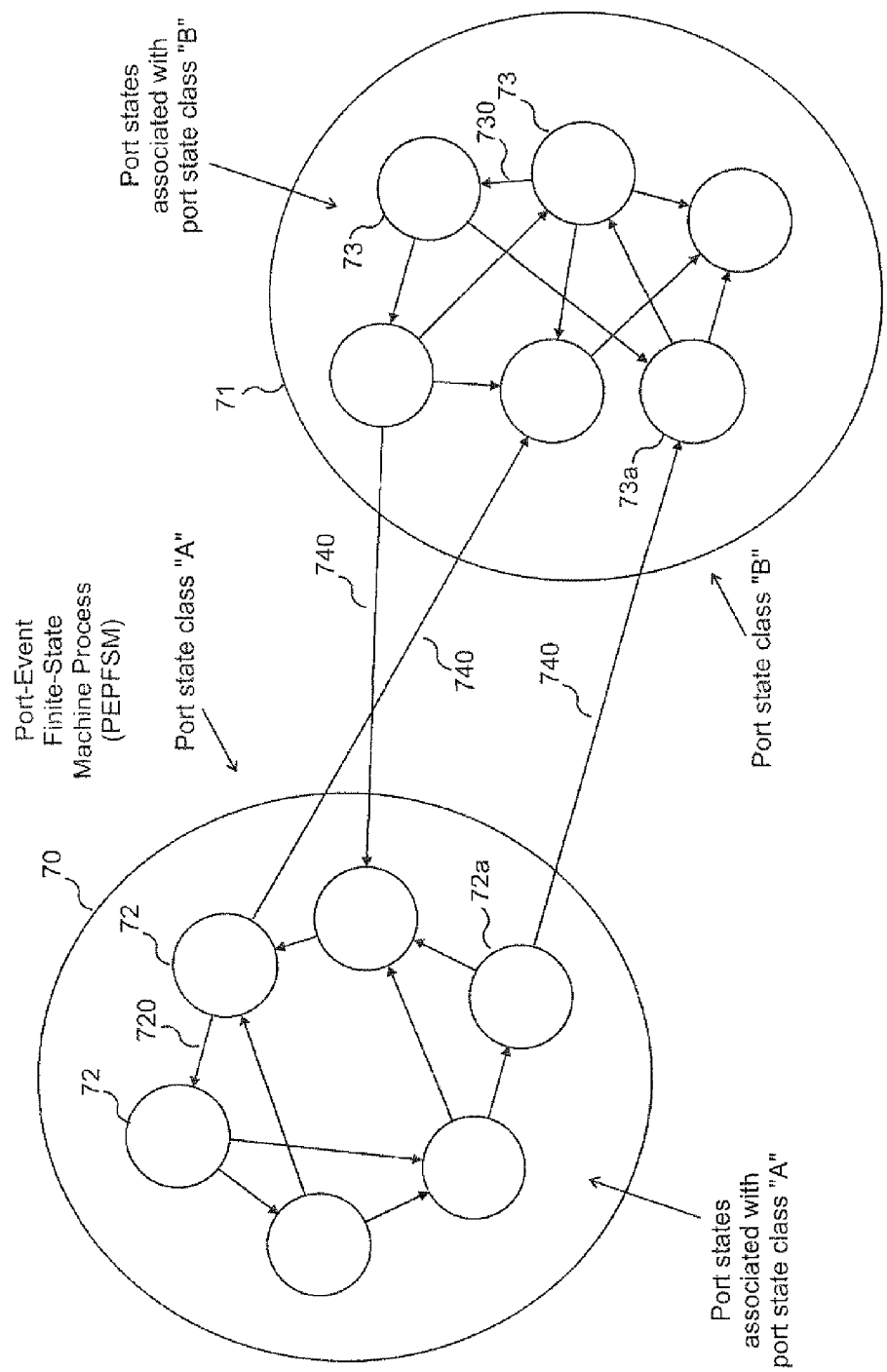
FIG. 3 shows the grouping of port states into separate classes.

FIG. 3 shows a pair of PEPFSM state groupings, each state grouping comprising a port state class 70, 71. Each port state class 70, 71 contains one or more port states, Port state class 70 contains port states 72, 72a. Port state class 71 contains port states 73, 73a distinct from all port states 72, 72a of port state class 70. A system's FSM has exactly one port state, and therefore exactly one port state class, at a time. A particular call event occurring when the FSM is in a first port state 72 brings about a transition 720 from the first port state 72 to a second port state 72. Some events occurring when the FSM is in a first port state 72a bring about transitions 740 from a first port state class 70 of the first port state 72a to a second port state class 71 and a second port state 73a.

The first port state class 70 of FIG. 3 is shown as "A", which might correspond to the TALKING state, and the second port state class 71 of FIG. 3 is shown as "B", which might correspond to the RINGING state, but other port state classes may be defined and used, each port state class containing a plurality of port states, so that the depiction of FIG. 3 should not be taken in any limiting sense.

Figure 4:
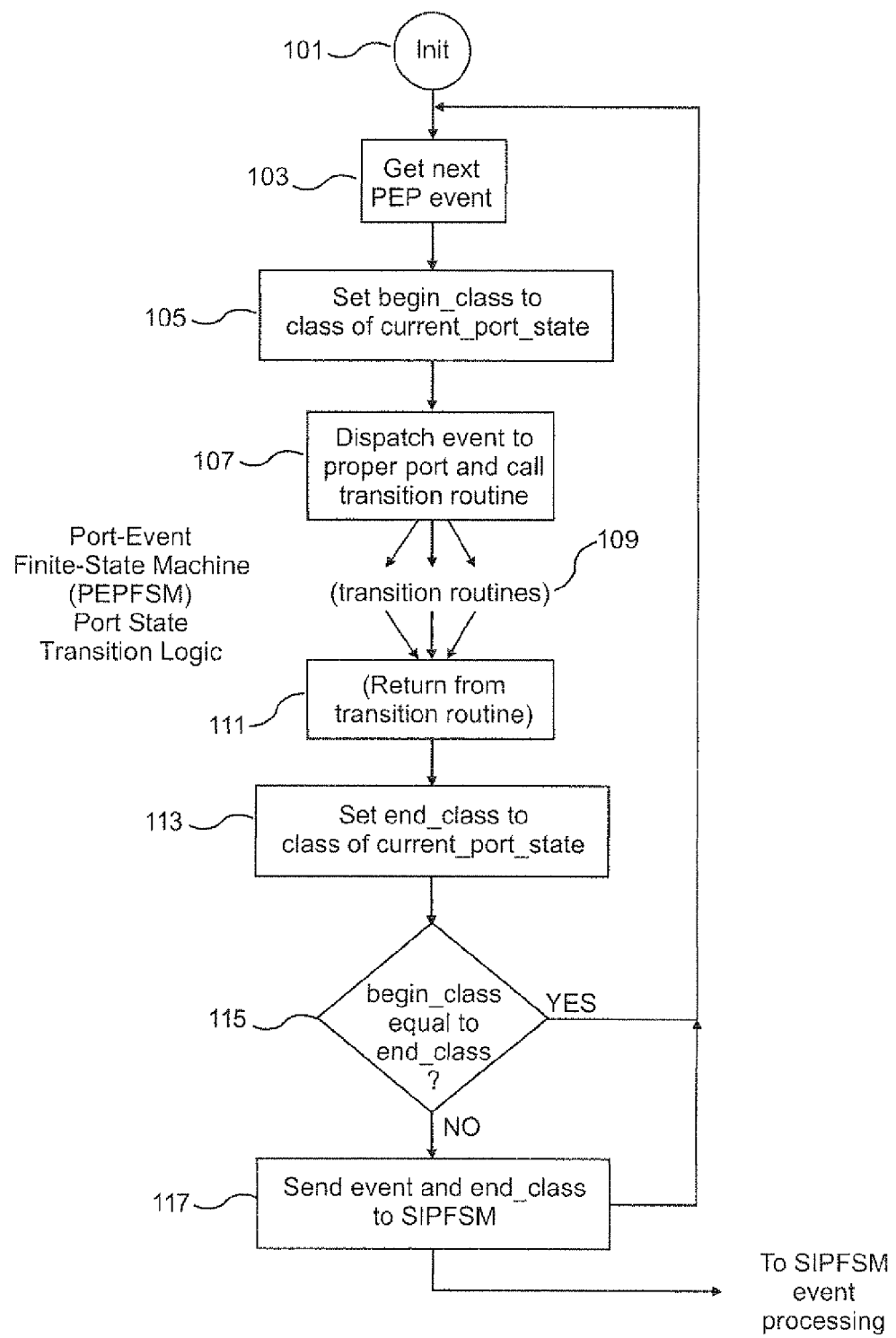
FIG. 4 is a flow chart of the invention's logic required for handling a port state transition.

FIG. 4 shows the method of the present invention. The PEPESM is shown as waiting (101) for an event to process. When an event is available, the System Scheduler 12 (FIG. 2) causes the PEPFSM to resume execution at the step "Get next PEP event" 103. At step 105 the invention sets a variable "begin_class" associated with the current port to the port class state of the current port's state (variable "current_port_state"). The variable "begin_class" is associated with the current port, and is located in the call's port record 27 of FIG. 5. The invention's retention of the current port class state provides for detection of transitions between port class states whenever they occur.

The event is then dispatched (107) for transition. Dispatching means that the invention uses the combination of the type of event occurring and the current port state to invoke a specific transition routine (109). The processing taking place within the transition routine (109) may change the current port's state (variable "current_port_state"). When the transition routine returns after completion (111), the invention sets (113) a variable "end_class" associated with the current port to the port class state of the current port's state (variable "current_port_state"). The variable "end_class" is associated with the current port, and is located in the call's port record 27 of FIG. 5.

The invention then compares (115) the current port's "begin_class" value with the current port's "end_class" value. If the two values are unequal, the invention sends (117) the event to the SIPFSM to initiate the SIPFSM processing of the change of port state. If the two values are equal, the invention bypasses all SIPFSM processing and awaits the next PEP event.

Figure 5:
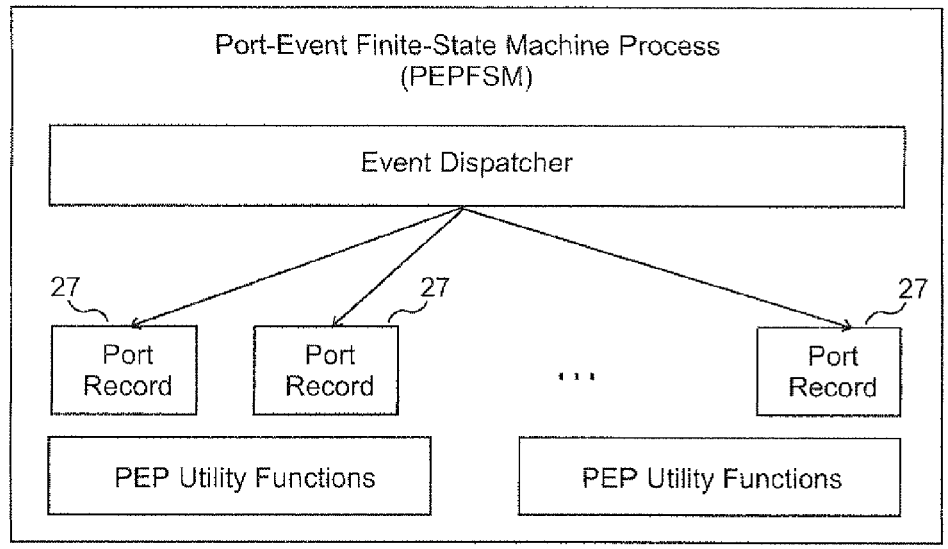
FIG. 5 is an overall view of the PEP finite state machine.
Figure 6:
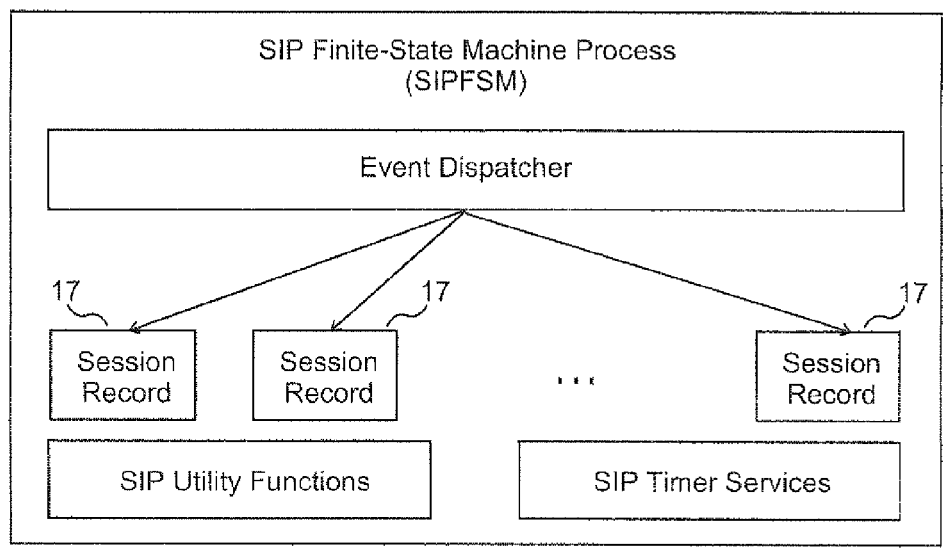
FIG. 6 is an overall view of the SIP finite state machine.

SIPFSM and PEPESM processes are quite similar in design and structure. FIG. 5 illustrates the use of port records (27) to store call states for the PEPFSM, and FIG. 6 shows the use of session records (17) to store call state classes for the SIPFSM.

The invention's port class comparison, a single test performed in one place for all port state transitions, eliminates the design, implementation, testing, and operation of like tests within each PEPFSM transition routine. In this way a myriad of PEPFSM transition routines are relieved of the task of communicating with the SIPFSM.

The invention's loose coupling of the PEPESM and the SIPFSM thereby allows both state machines to function more coherently, and simplifies software maintenance due to the reduced likelihood of introducing bugs in the SIP protocol by making non-SIP-related changes to PEP transition routines within any port state class.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. An apparatus for managing calls in a telephone system having switch-accessed phones and voice over internet (VoIP) phones comprising:
    one or more controllers, each controller establishing a connection between a switched access port and VOIP port to enable communication between the two ports, said controller having
        one or more switched access ports, each switched access port having a plurality of classes and said plurality of classes having one or more classes with multiple states;
        one or more VOIP ports, each VOIP port having a plurality of classes;
        first and second finite state machines for connecting one of the switched access ports to one of the VOIP ports to establish communication between the switched access port and the VOIP port;
        the first finite state machine transitioning the switched access port from one class to another class and transitioning the switched access port in one class to a different state in the same class in response to port events or messages from the second finite state machine and for generating messages to the second finite state machine representative of transitions in the class of the switched access port and not of transitions between states within a class;
        the second finite state machine transitioning the VOIP port from one class to another class in response to port events and messages from the first finite state machine and for generating messages to the first finite state machine representative of transitions between classes of the VOIP port.

2. An apparatus for managing calls in a telephone system having switch-accessed phones and voice over internet (VoIP) phones comprising:

one or more controllers, each controller for establishing a connection between a switched access port and VOIP port to enable communication between the two ports, said controller having one or more switched access ports, each switched access port having a plurality of classes and said plurality of classes having one or more classes with multiple states;

one or more VOIP ports, each VOIP port having a plurality of classes;

first and second finite state machines each responsive to port events and messages for connecting one of the switched access ports to one of the VOIP ports to establish communication between the switched access port and the VOIP port;

the first finite state machine for generating messages to the second finite state machine representative of transitions between classes of the switched access port and not of transitions between states within a class;

the second finite state machine for generating messages to the first finite state machine representative of transitions between classes of the VOIP port.

3. The apparatus of claim 2 wherein the first finite state machine transitions the switched access port from one class to another class and transitions the switched access port in one class to a different state in the same class in response to port events or messages from the second finite state machine.

4. The apparatus of claim 2 wherein the second finite state machine transitions the VOIP port from one class to another class in response to port events or messages from the first finite state machine.

5. The apparatus of claim 2 wherein the VOIP port is a logical connection for providing a port interface between the VOIP phone and the controller.

6. The apparatus of claim 5 wherein the logical connection is implemented with a media server or a gateway.

7. The apparatus of claim 2 wherein each VOIP phone has a physical connection extending from each phone and each controller to a routing infrastructure.

8. The apparatus of claim 7 wherein the routing structure is a local area network.

9. A method for managing calls in a telephone system having switch-accessed phones and voice over internet (VoIP) phones comprising:

providing switched access ports and VOIP ports, each VOIP port having a plurality of classes and each switched access port having a plurality of classes and one or more switched access ports having multiple states within a class;

establishing a connection between a switched access port and VOIP port to enable communication between the two ports;

responding to events occurring at each port and sending messages between ports regarding selected transitions at said port, said step of sending messages regarding selected transitions including generating messages at the VOIP port regarding transitions between classes at the VOIP port and sending said messages to the switched access port regarding said class transitions; and generating messages at the switched access port regarding transitions between classes at the switched access port and sending said messages to the VOIP port regarding said class transitions and not generating or sending messages regarding transitions to the VOIP port regarding transitions between states within a class.

\* \* \* \* \*